Dec. 6, 1949  E. W. FRIE ET AL  2,490,588
PORTABLE FOOD AND DRINK STAND
Filed March 16, 1944  4 Sheets-Sheet 1

Inventors:
Elmer W. Frie and
Frank Haloski.
By Soans, Pond & Anderson Attys

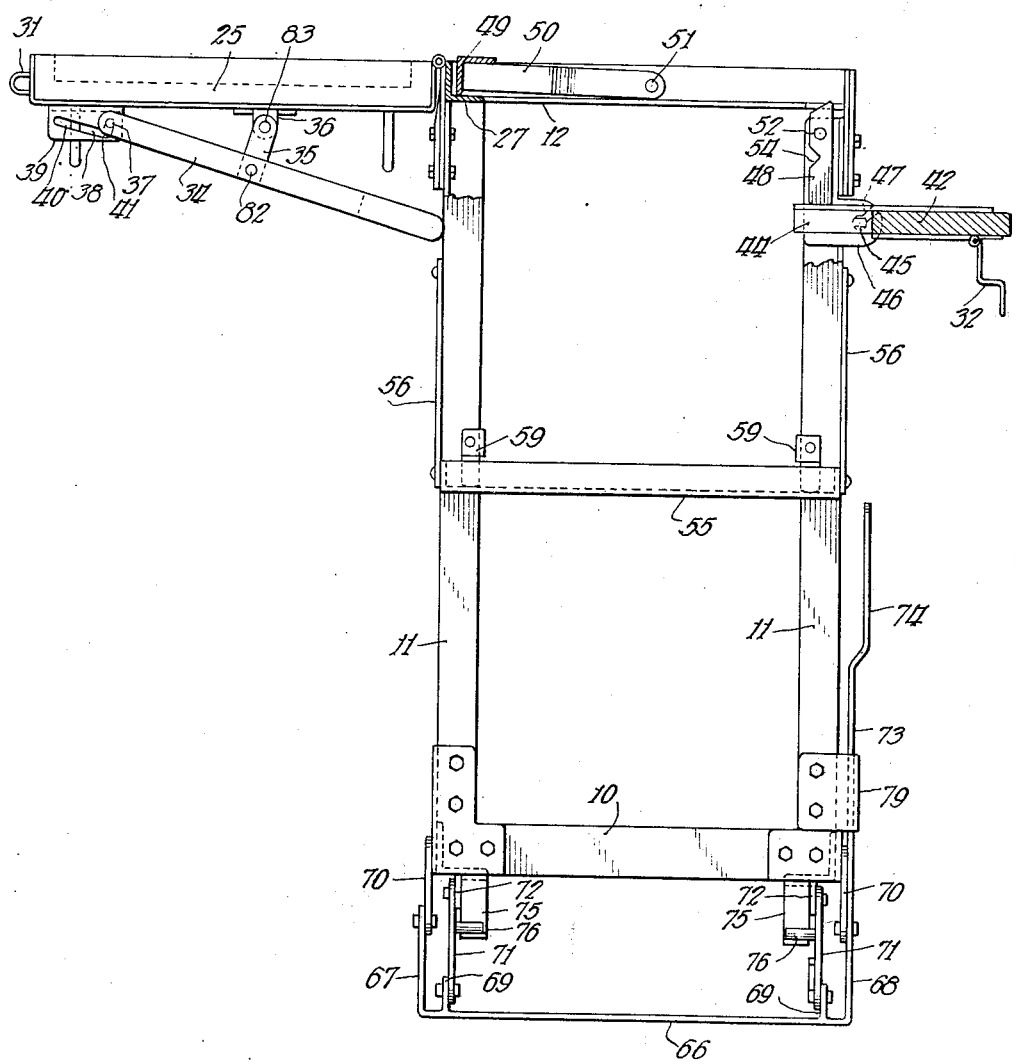

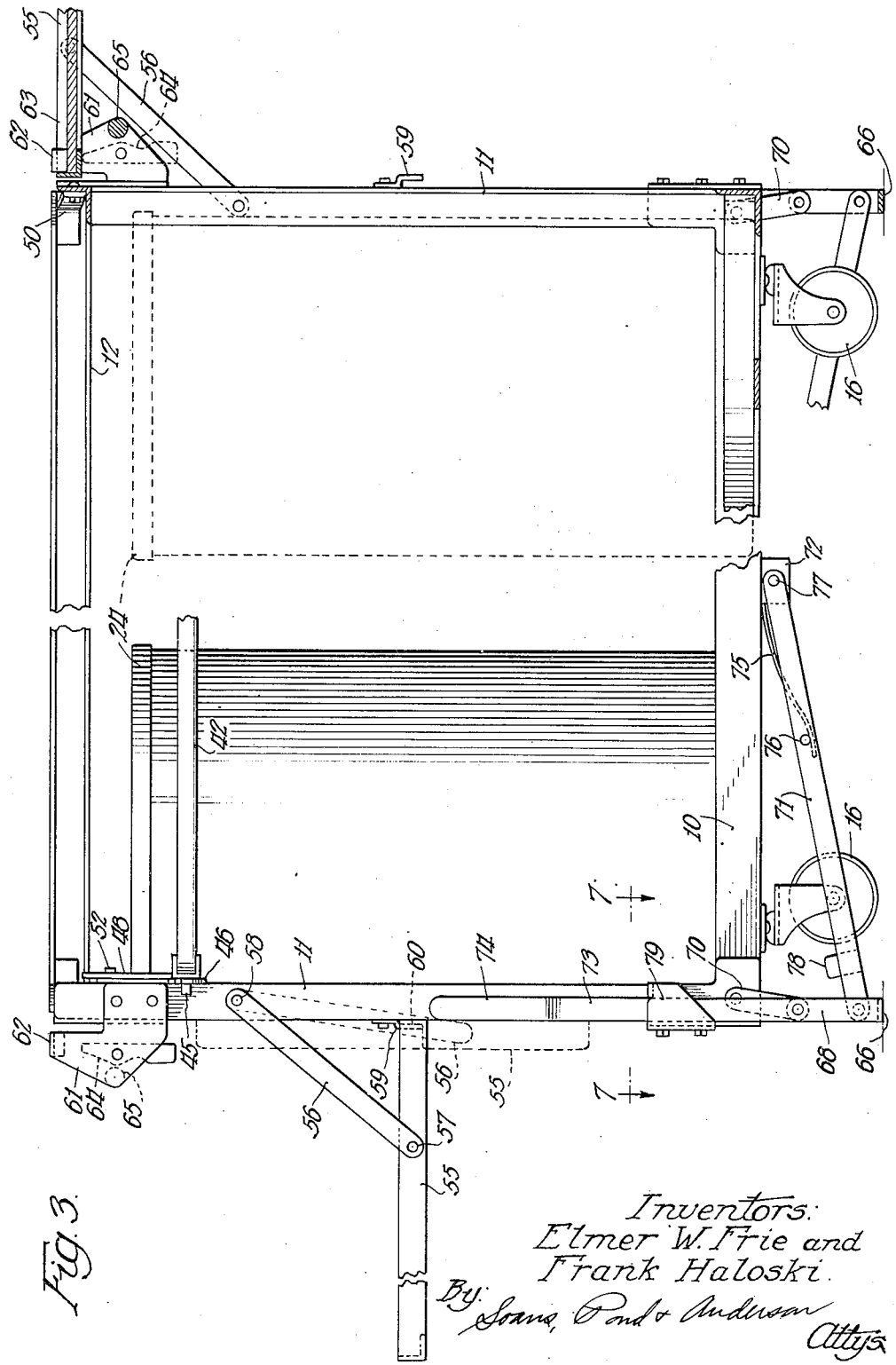

Dec. 6, 1949 E. W. FRIE ET AL 2,490,588
PORTABLE FOOD AND DRINK STAND
Filed March 16, 1944 4 Sheets-Sheet 4
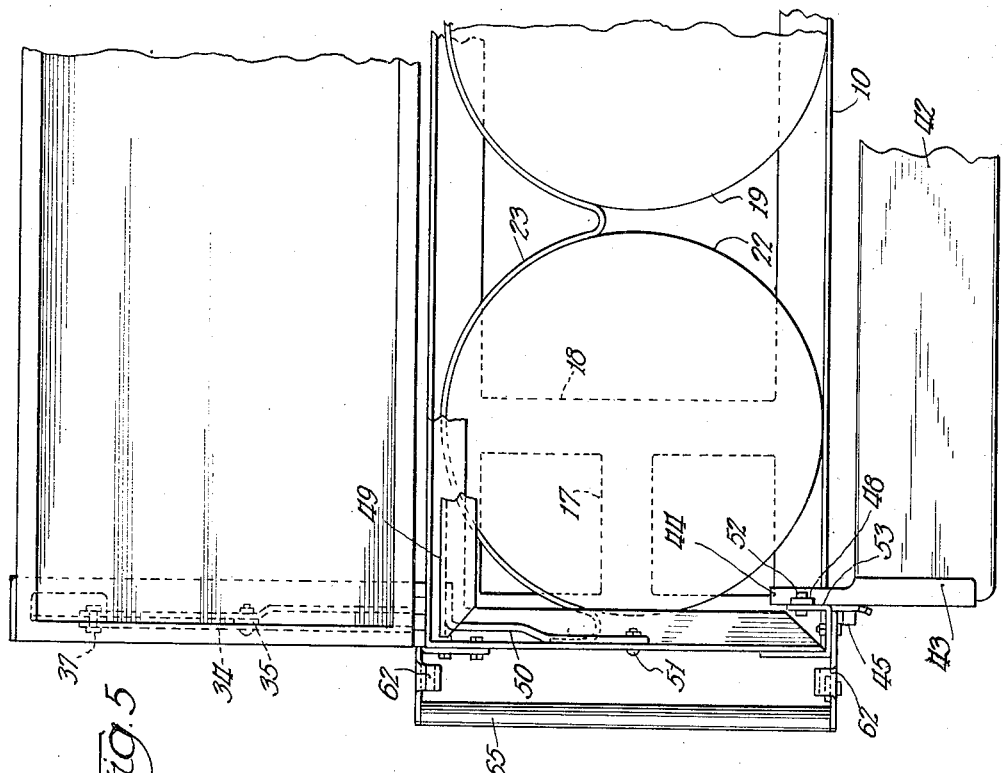
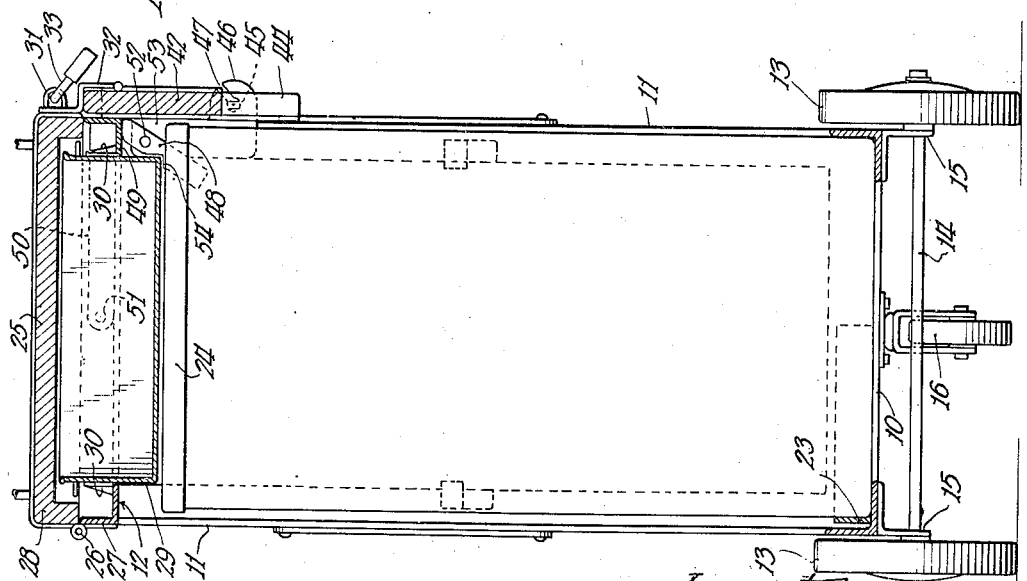
Inventors:
Elmer W. Frie and
Frank Haloski.
By Soans, Pond & Anderson Attys.

Patented Dec. 6, 1949

2,490,588

UNITED STATES PATENT OFFICE 2,490,588

PORTABLE FOOD AND DRINK STAND

Elmer W. Frie and Frank Haloski, Chicago, Ill., assignors to Vacuum Can Company, a corporation of Illinois Application March 16, 1944, Serial No. 526,785

10 Claims. (Cl. 296—22)

This invention relates to a portable stand by means of which supplies of food and drink may be easily and conveniently delivered to various locations within a building, or to various departments of a shop, and which may be adapted to like purposes, either inside or outside of a building.

The main objects of the invention are to provide a portable stand of the character indicated which may be readily moved from one place to another while carrying a substantial load of food and drink; to provide a stand of the character indicated which may be easily passed through doorways and aisles of relatively narrow width, to thereby facilitate movement of the stand from one department to another within a building; to provide a stand of the character indicated which may be adjusted to provide adequate facilities for the serving of food in buffet and cafeteria style; to provide such a stand wherein the food and drink supply may be effectively locked against unauthorized access pending opening up of the device for the normal service of the supplies carried thereby; to provide in such a stand means for effectively holding it in fixed position when so desired, without impairing its normal free portability when portability is desired; and in general, it is the object of the invention to provide an improved food and drink stand of the character indicated.

Other objects and advantages of the invention will be understood by reference to the following specification and accompanying drawings (four sheets) wherein there is illustrated a portable food and drink stand embodying a selected form of the invention.

In the drawings,

Fig. 2 is an end elevation, certain portions being broken away and shown in section;

Fig. 3 is a fragmentary view, partially in side elevation and partially in section, on a plane represented by the line 3—3 of Fig. 1;

Fig. 4 is a cross-section on the line 4—4 of Fig. 1;

Fig. 5 is a fragmentary plan showing the stand in unfolded, or opened condition;

Figure 1:
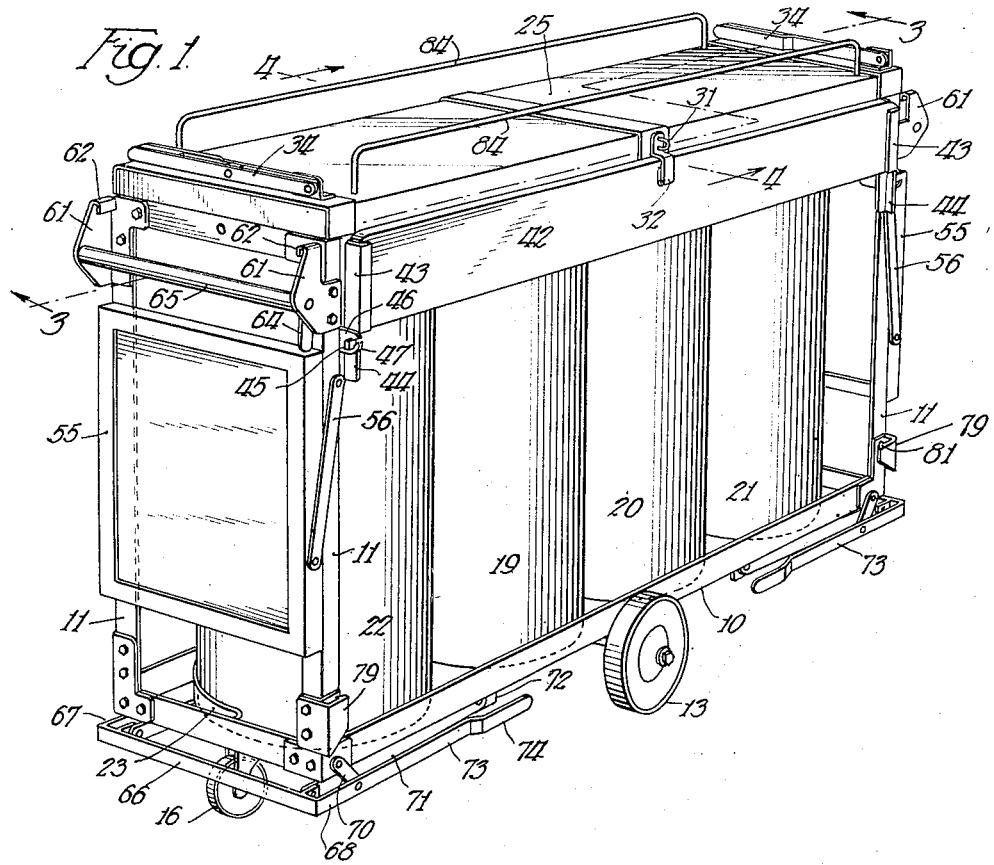
Fig. 1 is a perspective illustrating the stand in its closed and portable condition.
Figure 6:
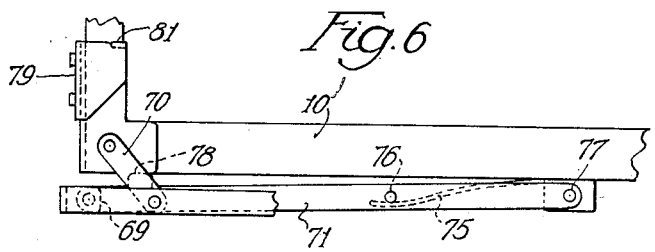
Fig. 6 is a fragmentary side elevation corresponding to a portion of Fig. 3, but showing the parts in a changed position.
Figure 7:
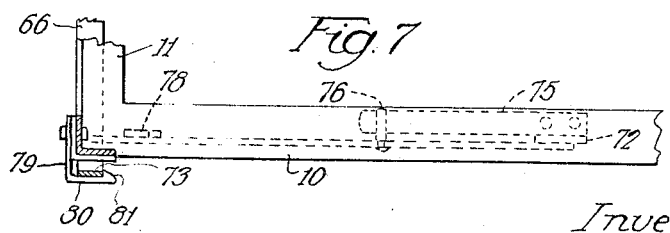
Fig. 7 is a section on the line 7—7 of Fig. 3.

The food and drink stand shown in the drawings comprises a bottom horizontal frame structure 10, which may be of angle iron, wood, or other suitable material. In the embodiment shown, it is of angle iron construction, the parts being suitably united at their adjacent ends. Corner posts 11 extend upwardly from each corner of the bottom frame, and the upper ends of the said corner posts are rigidly secured to a horizontal top frame 12 which may be of substantially the same constructional details as the bottom frame.

The frame structure comprising the parts 10, 11 and 12 may be portably supported by means of a pair of wheels 13—13 journaled on an axle 14 carried by suitable brackets 15—15 depending from the bottom frame 10 substantially midway between its opposite ends. At each end, the frame structure is provided with a suitably mounted caster on the bottom frame. As shown in Fig. 3, the casters 16 are preferably mounted inwardly from the ends of the frame structure so that they cannot project beyond the ends of the frame. Cross members suitably secured to the side members of the horizontal bottom frame may be provided for supporting the casters, but in this instance, it is preferred that the casters be mounted on a longitudinally extending bottom frame element 17 (Fig. 5) which is rigidly secured at its ends to the adjacent end members of the frame, and to a transverse member 18, which is in turn secured at its ends to the respectively adjacent side members of the said bottom frame 10.

The horizontal bottom frame 10 may be provided with a floor, but in the present instance, it is left open. However, the horizontal flange portions of the angle iron members forming the frame constitute bottom portions on which food containers 19, 20 and 21, and a drink container 22, may be placed and adequately supported. If desired, a suitably shaped strap-like member 23 (Figs. 1 and 5) may be secured in the bottom frame to position the respective containers, as best illustrated in Fig. 5.

The food and drink containers are preferably formed with flat top, removable covers 24, and they may be of a vacuum or otherwise jacketed type of container capable of maintaining the food and drink at the desired temperature for a substantial length of time. Within each of the food containers, there may be provided a series of stacked food-containing pans, which may be successively removed as required.

A cover member 25 is hingedly connected, as indicated at 26, to the side member 27 of the upper frame 12. Said cover member is provided with downwardly extending peripheral flanges 28 which engage the upper edges of the frame 12. The flanged cover thus effectively encloses the open upper end of a serving pan 29 which may be seated within the frame 12, if supported thereon by means of lugs 30 attached to the sides of the pan. The side of the cover 25 opposite to its hinged side is provided with a suitable eye 31, which is adapted to co-operate with a hasp 32 and a padlock 33 to lock the cover in closed position.

The cover, when unlocked, is adapted to be swung to the laterally extending shelf position shown in Fig. 2. To support the cover in shelf position, there is provided a brace 34, which is linked to the bottom surface of the shelf by means of a short link 35 pivoted at one end to the brace 34 intermediate its ends, and at the other end to a suitable bracket 36 attached to the cover 25. The outer end of the brace 34 has secured to it a pin 37 which is movable in a slot 38 provided in a bracket 39 secured to the cover 25. A brace of the character described is preferably provided at each end of the cover, and, as shown in Figs. 1 and 5, may be of double bar construction. As shown in Fig. 2, the slot 38 embodies a relatively long, straight, inclined portion 40, and a short angularly offset portion 41. When the brace is in shelf-supporting position, as shown in Fig. 2, the pin 37 at the outer end of the brace engages the bracket edge formed by the short laterally offset slot portion 41, and the other end of the brace abuts against the adjacent corner post 11. The brace thus forms a strut between the framework of the stand and the outer edge portion of the shelf.

When the cover is closed, the pin 37 of the brace 34 may be caused to move to the other end of the slot 38, the link 35 being then folded into the plane of the brace 34 and the latter being folded into parallelism with the adjacent surface of the cover 25. In this instance, the pivot connection between the link 35 and the brace 34 is so located that the portion of the brace between the leg 11 (Fig. 2) and the link pivot connection 82 is somewhat longer and heavier than the portion of the brace between said pivot connection 82 and its pin-carrying end. The result is that the brace is caused by gravity to automatically adjust itself to the operative position illustrated.

When the member 25 is swung from the shelf position to cover position, gravity will, of course, cause the brace to rock downwardly about its pivot 82 so that the pin 37 will be rocked out of the transverse slot portion 41 into the inclined slot portion 40, whereupon gravity will further cause the brace to swing about the pivot 83 under the control of the link 35 until the brace is in its collapsed position flatwise of the member 25, as shown in Fig. 1.

When the cover is opened to the shelf position shown, it is adapted to support trays of silverware, napkins, tableware, or other items which it may be found convenient to place thereon.

On the other side of the stand, there may be provided a narrow shelf member 42, this shelf member being preferably pivotally mounted near its lower edge on the frame structure in such a manner that the shelf will constitute a lock for preventing displacement of the containers 19, 20, 21 and 22, and also so that it may be removed in its entirety to facilitate removal of the said containers. In the present instance, the shelf 42 is provided at its ends with metallic end members 43—43, each of which has a depending leg portion 44. Each leg portion 44 has secured to it a pivot pin 45 which enters suitable holes in brackets or ears such as indicated at 46, which are secured to and extend from the corner posts 11—11 of the frame structure. As best shown in Fig. 1, the pivot pins 45 are somewhat flattened so that their parallel sides extend in the direction of the width of the shelf. The brackets 46 are equipped with slots 47 extending at an angle of about 45° from the outer edges of the brackets to the pivot pin receiving openings. By this arrangement, the shelf structure 42 may be removed in its entirety by swinging the shelf to an angle corresponding to the angle of the slots 47, and then lifting the shelf so as to remove its pivot pins 45 from the brackets or ears 46.

When the shelf 42 is in closed position, as shown in Figs. 1 and 4, it does not add materially to the width of the device, and in fact, does not project laterally beyond the outermost surfaces of the wheel 13, hence this shelf, when in closed position, may pass through any doorway or aisle through which the stand may be rolled. The hasp 32 is pivotally secured to the shelf 42 as shown, so that when the stand is in closed condition, the cover 25 and the shelf 42 are both locked in closed condition by the lock 23. When the stand is to be opened, the cover 25 is, of course, swung to its shelf position already described, whereupon the shelf 42 is released and may initially be permitted to swing through an arc of 180° so that it extends downwardly from its pivot mounting. The leg or tail portions 44 of the shelf 42 are short enough to pass the pivoted locking members or dogs 48, which will be hereinafter further described. The pan, such as 29, may then be removed and placed on the shelf 25.

The side member 49 of the top frame 12 is movably mounted so that it may be swung from its normal position, as shown in Fig. 4, to an out-of-the-way position, to facilitate removal of the covers 24 of the containers 19 to 22 inclusive. In this instance, the side angle member 49 of the top frame has secured to it at each end, an inwardly extending arm 50, the inner end of which arm is pivoted, as shown at 51, to the adjacent end member of the top frame 12. The pivot 51 is so located that the side member 49 may be swung about the pivot 51 to the opened position shown in Fig. 2, wherein said side member 49 overlies and rests on the side member 27. In the closed position of the stand, the side member 49 is supported in its normal frame position, as shown in Fig. 4, by engagement of its end arms 50 with the horizontal flanges of the end portions of the frame 12.

A locking dog or latch 48 is provided at each end of the stand, being pivoted as shown at 52 to an ear 53 formed as a part of a bracket of which each of the previously mentioned ears 46 is a part. The brackets comprising the ears 46 and 53 are suitably secured to the corner posts 11. When the front member 49 of the top frame 12 is in its frame position, as shown in Fig. 4, it engages the upper end of the dog 48 and rocks said dog to the angular position shown in Fig. 4. The dog is notched, as shown at 54, to clear the adjacent corner of the pan 29. In the angular position of the dog 48 shown in Fig. 4, the tail part 44 of the shelf structure 42 will clear the dog so that the shelf may be swung, as above described, from its vertical upwardly extending position to an intermediate and temporary downwardly extending position. When the front frame member 49 is swung over to its open position, the dog 48, by gravity, assumes a vertical position, as shown in Fig. 2. The shelf 42, which has previously been swung to a downwardly extending position, may then be swung upwardly to a horizontally extending position, and during such movement, the tail pieces 44 of the shelf 42 will engage and swing the depending portions of the dogs 48 inwardly until the dogs are permitted by gravity to return to overlying position to the said tail pieces 44. When the dogs 48 return to their depending positions, as shown in Fig. 2, their lower ends abut the upper edges of the tails 44 to thereby lock the shelf 42 in its operative horizontal position. The provision of the pivoted dogs instead of fixed stops, permits the stand to be used with the shelf in the above mentioned downwardly extending position which will afford the advantage of permitting an attendant to stand somewhat nearer to the food containers while also positioning the shelf member in a position below the tops of the containers to which access is desired.

The purpose of swingably mounting the front frame member 49 is to facilitate removal of the covers 24 of the containers to thereby permit access to the food-containing pans stored in the containers. It will be observed by an inspection of Fig. 4, that the covers 24 could be removed only with considerable manipulation to pass the covers between the relatively narrow space between the inner edges of the top frame structure, in the event that the frame structure were made rigid or without the described adjustable side member. This arrangement, i. e. the displaceability of the frame element 49, also facilitates access to food pans which may be withdrawn from within the containers and placed on top of the containers (the covers of the latter having been first replaced) for dispensing purposes.

In addition to the shelf provisions already described, the stand may be equipped with a shelf at each of its ends. For example, each end may have a shelf 55 associated therewith, and in this instance, the shelves 55 are permanently, but adjustably, secured to the respective ends of the stand by means of links 56 which extend from the opposite sides of the shelves to the respectively adjacent corner posts 11 (see Figs. 1, 2, and 3).

The links 56 are pivotally connected at one end to the sides of the shelf, as shown at 57, nearer to the normally lower, or inner, end of the shelf than to the upper, or outer, end thereof. The other, or upper end of each of the links 56 is pivoted to the adjacent corner post 11, as shown at 58. In the collapsed position of the shelves 55, they are suspended by the links 56 in vertically disposed position, substantially parallel with the vertical planes of the ends of the stand. Because of the weight of the respective shelves and the angular disposition of their suspending links 56 when the shelf is in collapsed position, the shelves will automatically maintain themselves in the said collapsed position.

The shelves 55 may each be adjusted to an operative, or horizontal position, selectively at either of two heights. A lower position is illustrated at the left-hand end of Fig. 3, and a higher position is illustrated at the right-hand end of the same figure. For maintaining the shelf 55 in the lower position, the adjacent corner posts 11 are provided with clips 59, portions of which are spaced from the respective corner posts sufficiently to permit a vertical flange-like portion 60 of the inner end of the shelf 55 to fit between such portions of the clips and the corner posts. The interengaging clips and shelf portions co-operate with the links 56 to maintain the shelf 55 in the lower horizontal position. It has been found unnecessary to provide locking means to prevent rocking of the shelf from shelf position to folded position. A major portion of the shelf is disposed outwardly of the pivots 57 so that there is no material likelihood that sufficient load can be placed on the inner portion of the shelf to over-balance the outer portion of the shelf and any load that may be placed thereon.

For maintaining the shelf in the elevated position shown at the right-hand end of Fig. 3, there are provided brackets 61, respectively secured to the corner posts and provided at their upper ends with inwardly and downwardly turned ear portions 62. The downwardly turned ear portions 62 co-operate with the main plate portions of the bracket 61 to form recesses for receiving side edge flange portions 63 of the shelves. It is preferred that means be provided for more securely locking the shelf in its elevated position, and for this purpose, there is provided on one of the brackets 61 at each end, a pivoted locking dog 64. The dog 64 is pivoted to one of the brackets 61, and has its depending portion so weighted that it normally tends to rock the dog to the vertical position illustrated in Fig. 3, wherein the upper end of the dog engages the under side of the shelf 55 to normally prevent movement of the flange portions 63 thereof out of the aforesaid recesses. It will be seen by an inspection of Fig. 3 that the arrangement is such that when the shelf is adjusted inwardly under the control of the links 56, into engagement with the recesses formed by the ears 62, the dog 64 may be pushed out of the way by the end of the shelf, and caused to automatically assume its operative position when the shelf is adjusted to its proper shelf position.

The brackets 61 may be so formed as to constitute means for attaching end handles 65 to the stand to facilitate movement of the stand from place to place.

From an inspection of Fig. 4, it will be seen that the end casters 16 are of such size that they depend from the bottom of the truck to a slightly lesser extent than do the main wheels 13—13 at the center of the stand. Accordingly, when the stand is propelled, its weight is supported mainly by the centrally located wheels 13—13, and the wheels 16—16 primarily prevent excessive rocking of the stand about the axis of its central wheels and provide means for temporarily supporting the stand in a slightly canted position. When the stand is to be opened up for the dispensing of food or drink, it should be firmly supported in a substantially horizontal position, and in such a manner that it cannot be rocked about the axis of its central wheels 13.

For the purpose of supporting the stand when in food dispensing position, there is provided at each end of the stand, auxiliary leg means. The auxiliary leg means herein shown comprises at each end of the stand, a rigid U-shaped member, preferably of metal, embodying a bottom bar 66, upwardly extending side arms 67 and 68, and upwardly extending ears 69—69 adjacent the respective side arms 67 and 68. The U-shaped members are connected by means of short links 70—70 extending from the upper ends of the side arms 67 and 68 to the bottom frame of the stand adjacent an end thereof. The said U-shaped members are also connected to the stand by longer links 71—71 which are pivotally connected to the ears 69—69 and to ears or brackets 72, which depend from the bottom frame of the stand. One of the side arms, in this instance the side arm 68, is extended to provide a handle portion, or lever 73, having a slightly offset handle portion 74, which may be manually adjusted from the horizontal, inoperative position shown in Fig. 1 to an upwardly extending, or substantially vertical position, as shown in Figs. 2 and 3. One or more leaf springs 75 may be secured to the bottom frame of the stand and caused to engage pins, such as 76, projecting from the links 71, to normally urge the said links to move in an upward direction about the pivots 77 whereby they are connected to the brackets 72. The springs 75 overcome the tendency of the auxiliary leg structures to be moved by gravity from collapsed position to operative position. Upward movement of the links 71 under the influence of the springs 75, is preferably limited by means of stops such as indicated at 78, carried by the respective links, and adapted to engage the bottom of the lower frame of the stand.

For locking the auxiliary leg structure in operative position, there is provided in association with each hand lever 73, a bracket 79. Each bracket 79 has a leg portion 80 and an end enlargement 81. The arrangement is such that when the hand lever 73 approaches its vertical position, as shown in Fig. 3, it must be moved inwardly toward the side of the stand sufficiently to pass by the inwardly extending enlargement 81, whereupon it may be permitted to spring outwardly into engagement with the leg part 80. The hand lever 73 is thus locked against excessive movement in the direction for adjusting the leg structure from inoperative to operative position, and it is also held against accidental return or collapsing movement. Before the auxiliary leg structure may be collapsed, the hand lever 73 must be forced inwardly in order that it may again pass the enlargement 81 in its leg collapsing movement.

In the described structure, the relationship of the parts is such that when proper containers are positioned on the bottom frame, and the cover and shelf members 25 and 42 are locked in their closed positions, the food and drink containers are locked against removal, and against unauthorized access. For example, the cover member 25, when locked in the position shown in Fig. 4, prevents access to and removal of the serving pan 29 from its position within the top frame 12. Also, the cover 25, in the locked position shown, prevents an adjustment of the top frame element 49 from its normal frame position, to the open position before described. As shown, the serving pans depend into such close proximity to the covers 24 of the containers that there is not enough room left between the covers and the overlying containers to permit removal of the container covers. In any event, even though it were possible to force a cover upwardly from the container sufficiently to permit its withdrawal from one side of the stand, access to the content of the container continues to be obstructed by the overlying serving pans. In most instances, the food containers employed in a stand of this kind are of a jacketed wall type providing thermal insulation to maintain the required temperature of the food or drink within the respective containers. As a practical matter, with such containers, the food receiving inner chamber is covered substantially in its entirety by the serving pans 29, so that useful access to the food containers would not be gained, even though the covers 24 could be removed. Furthermore, because of the lack of space overlying the food containers, it is impossible to lift the container sufficiently to move it laterally over the positioning strip 23, or the vertical side flange of the bottom frame at one side of the structure, or over the vertical upstanding flange at the other side thereof. Hence, the supplies stored in the containers are safeguarded against unauthorized appropriation when the structure is properly closed and locked as described.

Various gadgets and auxiliary conveniences, such as bottle openers, cap removers, hooks, etc. may be attached to the structure where desired. Also, retaining bars, such as shown at 84 (Fig. 1) may be provided on the member 25 to prevent various auxiliary supplies from sliding off the top of the stand when the stand is being moved about from place to place.

It will be apparent that the details of the described construction may be varied considerably without departing from the principles of the described invention.

We claim:

1. A portable stand of the class described, comprising a wheel-supported frame structure adapted to portably support a plurality of food and/or drink containers having removable covers on their upper ends, said frame structure embodying a horizontal top frame normally overlying the containers supported by the stand and having one side member provided with end arms extending in substantially parallel relation to the adjacent ends of said horizontal frame and pivoted thereto approximately midway of the length of the ends of said frame, whereby said side member is adjustable from normal frame position to open position overlying its opposed side member, thereby, to facilitate access to and removal of the covers of said containers.

2. In a portable food and drink stand having a wheel-supported elongated open frame structure embodying horizontal bottom and top frames and vertically extending corner posts rigidly connecting said frames, said frame structure being adapted to receive a plurality of containers intermediate its top and bottom frames and within the horizontal dimensions of the frame structure and being arranged for the insertion of such containers laterally through a side of the frame, means extending upwardly from said bottom frame for engagement by the lower end portions of such containers to position the same on said lower frame against lateral displacement, a pan supported by said upper frame and extending at least partially therethrough into proximity to the top of a container positioned thereunder in said frame structure, a member overlying said pan and hinged to one side of said main frame structure so as to be adjustable from said overlying position to a laterally extending, shelf position, said member, when in said overlying position, being operative to prevent upward displacement of said pan and through said pan, to prevent sufficient upward displacement of said containers to enable the latter to be moved laterally over said upwardly projecting means, and means for locking said member in said overlying position.

3. A portable stand of the class described, comprising a wheel-supported main frame structure adapted to portably support a plurality of food and/or drink containers having removable covers on their upper ends, said main frame structure embodying a horizontal top frame normally overlying the containers supported by the stand and having one side member displaceably mounted so as to permit movement thereof from normal frame position to an open position facilitating access to and removal of the covers of said containers, a shelf member pivotally mounted on one side of said frame structure, said shelf being adapted to be folded to an inoperative position extending upwardly from its pivot mounting and substantially flatwise against the side of the stand, releasable means for locking said shelf member in said upwardly extending position, a dog pivotally mounted on the stand in such position as to be engaged by said displaceable frame member when in frame position, to be thereby held in inoperative position, said dog being also adapted to move to an operative position when said displaceable top frame member is disengaged therefrom, said shelf member having an extension element adapted to engage said dog when in operative position for cooperating with the pivot mounting of the shelf to support the same in horizontal position, said shelf member being initially adjustable from its upwardly extending position to a downwardly extending position while said displaceable top frame member is in normal frame position and thereafter, when said top frame member is adjusted to an opened position, swung upwardly to horizontally extending position, said shelf extension and said dog being automatically engageable as an incident to the movement of said shelf member from said depending position to said horizontal position.

4. In a portable food and drink stand having a wheel-supported frame adapted to portably support a plurality of containers of food and/or drink and a member mounted on said frame so as to be foldable to and from a cover position overlying any such containers from and to a shelf position extending laterally from said frame, a brace inoperatively disposed substantially in face-to-face engagement with the top of said member when the latter is in cover position, and means adjustably connecting said brace to said member for adjustment to operative position in which the brace extends downwardly and inwardly from the member into engagement with a portion of said frame for supporting said member when in shelf position, said connecting means comprising a link pivotally secured at its ends respectively to said brace and to said member, and a laterally movable pivot connection between one end of said brace and said member.

5. In a portable food and drink stand having a wheel-supported frame adapted to portably support a plurality of containers of food and/or drink and a member mounted on said frame so as to be foldable to and from a cover position overlying any such containers from and to a shelf position extending laterally from said frame, a brace inoperatively disposed substantially in face-to-face engagement with the top of said member when the latter is in cover position, and means adjustably connecting said brace to said member for adjustment to operative position in which the brace extends downwardly and inwardly from the member into engagement with a portion of said frame for supporting said member when in shelf position, said connecting means comprising a link pivotally secured at its ends respectively to said brace and to said member, a slotted bracket attached to the member, a pin extending from said brace through said slot for removably connecting one end portion of said brace to said member, the slot having a portion permitting the shelf end of the brace to move in the direction of the plane of the member, and another portion extending transversely of the plane of the member providing a bracket edge adapted to be engaged by said pin when the brace is in shelf-supporting position in which the opposite end of said brace abuts said frame.

6. In a portable food and drink stand having a wheel-supported frame adapted to portably support a plurality of containers of food and/or drink and a member mounted on said frame so as to be foldable to and from a cover position overlying any such containers from and to a shelf position extending laterally from said frame, a brace inoperatively disposed substantially in face-to-face engagement with the top of said member when the latter is in cover position, and means adjustably connecting said brace to said member for adjustment to operative position in which the brace extends downwardly and inwardly from the member into engagement with a portion of said frame for supporting said member when in shelf position, said connecting means comprising a link pivotally secured at its ends respectively to said brace and to said member, a slotted bracket attached to the member, a pin extending from said brace through said slot for movably connecting one end portion of said brace to said member, the slot having a portion permitting the shelf end of the brace to move in the direction of the plane of the member, and another portion extending transversely of the plane of the member providing a bracket edge adapted to be engaged by said pin when the brace is in shelf-supporting position in which the opposite end of said brace abuts said frame, said mounting of the brace serving to cause the brace to gravitate to operative position as an incident to unfolding of said member to shelf position, and the brace being so balanced at its link connection with said member as to cause the pin carried by the brace to be automatically moved into said transversely extending slot portion.

7. In a portable food and drink stand having a wheel-supported main frame structure adapted to portably support a plurality of containers, a shelf member pivotally mounted adjacent one edge thereof on one side of said main frame structure for movement from a normal shelf position to a folded position extending upwardly from its pivot mounting and substantially flatwise against the side of the stand, said shelf member having an arm portion extending from the pivoted edge thereof beyond said pivot mounting, a dog movably mounted on said main frame structure and engageable with said arm for supporting the shelf in said normal shelf position, said dog being displaceable to permit the shelf to be also swung to an inoperative position depending from said pivot mounting and substantially flatwise against the side of the stand.

8. In a portable food and drink stand having a wheel-supported elongated open frame structure embodying horizontal bottom and top frames and vertically extending corner posts rigidly connecting said frames, said frame structure being adapted to receive a plurality of containers intermediate its top and bottom frames and within the horizontal dimensions of the frame structure, and being arranged for the insertion of such containers laterally through a side of the frame, means extending upwardly from said bottom frame for engagement by the lower end portions of such containers to position the same on said lower frame against lateral displacement, a shelf member pivotally and removably mounted adjacent one edge thereof on the upper portion of the container entrance side of the frame where said shelf member constitutes an obstruction to insertion and removal of said containers, said removable mounting of the shelf permitting removal of such obstruction to facilitate such container insertion and removal, the pivot mounting of said shelf permitting the shelf to be adjusted from a closed position flatwise against said side of the frame in upwardly extending relation to said pivot mounting to a horizontal shelf position extending outwardly from the frame and to an inoperative, out-of-the-way position depending from said pivot mounting and flatwise against said frame, and disengageable stop means for supporting said shelf in said horizontal shelf position when desired.

9. In a portable food and drink stand having a wheel-supported elongated open frame structure embodying horizontal bottom and top frames and vertically extending corner posts rigidly connecting said frames, said frame structure being adapted to receive a plurality of containers intermediate its top and bottom frames and within the horizontal dimensions of the frame structure, and being arranged for the insertion of such containers laterally through a side of the frame, means extending upwardly from said bottom frame for engagement by the lower end portions of such containers to position the same on said lower frame against lateral displacement, said horizontal top frame having a fixed portion normally overlying the containers supported by the stand, and having a movable portion also normally disposed in overlying relation to said containers as a part of said top frame, said movable portion being displaceable from such normal position so as to afford free access to the upper ends of containers positioned in the stand and whereby insertion of such containers into the stand and their removal therefrom is also facilitated.

10. In a portable food and drink stand having a wheel-supported elongated open frame structure embodying horizontal bottom and top frames and vertically extending corner posts rigidly connecting said frames, said frame structure being adapted to receive a plurality of containers intermediate its top and bottom frames and within the horizontal dimensions of the frame structure and being arranged for the insertion of such containers laterally through a side of the frame, means extending upwardly from said bottom frame for engagement by the lower end portions of such containers to position the same on said lower frame against lateral displacement, a pan supported by said upper frame and extending at least partially therethrough into proximity to the top of a container positioned thereunder in said frame structure, and a member overlying said pan and hinged to one side of said main frame structure so as to be adjustable from said overlying position to a laterally extending shelf position, said member, when in said overlying position, being operative to prevent upward displacement of said pan and through said pan to prevent sufficient upward displacement of said containers to enable the latter to be moved laterally over said upwardly projecting means.

ELMER W. FRIE.
FRANK HALOSKI.

REFERENCES CITED

The following references are of record in the file of this patent:

UNITED STATES PATENTS

| Number | Name | Date |
|---|---|---|
| 159,309 | Fisher | Feb. 2, 1875 |
| 1,304,279 | Dietrich | May 20, 1919 |
| 1,328,753 | More | Jan. 20, 1920 |
| 1,375,121 | Swartzbaugh | Apr. 19, 1921 |
| 1,455,395 | Exum | May 15, 1923 |
| 1,520,579 | Knutson | Dec. 23, 1924 |
| 1,562,089 | Holley | Nov. 17, 1925 |
| 1,585,834 | Drinkwater | May 25, 1926 |
| 1,654,330 | Jenkins | Dec. 27, 1927 |
| 1,890,289 | Harrison | Dec. 6, 1932 |
| 1,962,454 | Meanor et al. | June 12, 1934 |
| 1,994,857 | Krause | Mar. 19, 1935 |
| 2,031,287 | Swanson | Feb. 18, 1936 |
| 2,057,197 | Liptay | Oct. 13, 1936 |
| 2,119,313 | Burdge | May 31, 1938 |
| 2,185,073 | Chamberlain | Dec. 26, 1939 |
| 2,249,403 | Stollsteimer | July 15, 1941 |

FOREIGN PATENTS

| Number | Country | Date |
|---|---|---|
| 352,141 | Great Britain | July 9, 1931 |